Oct. 5, 1937.   H. A. STILSON   2,094,686
ANIMAL TRAP
Filed Oct. 24, 1935
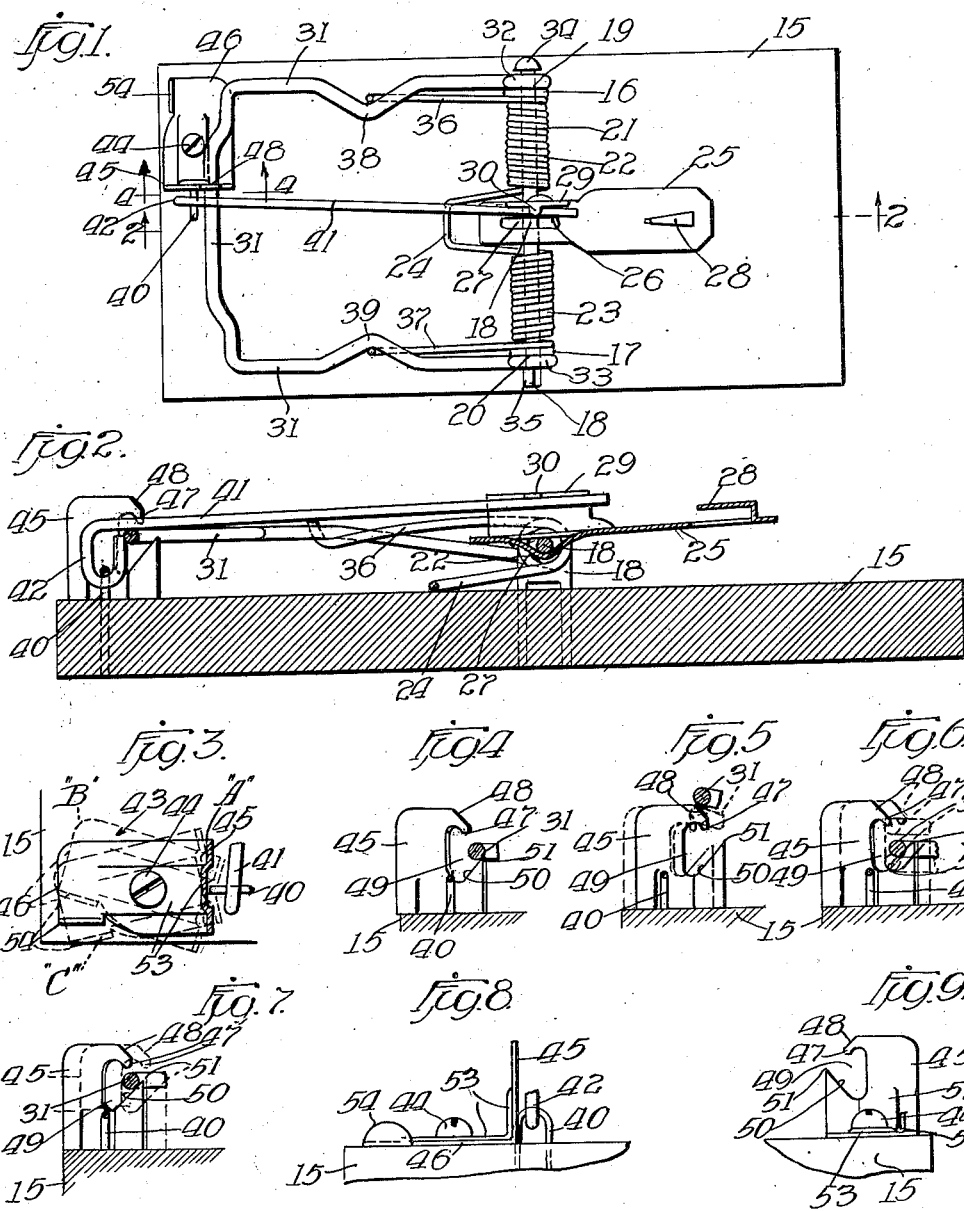
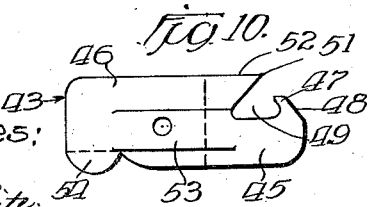
Inventor
Herbert A. Stilson
By Harvey L. Hanson
Attorney
Witnesses:
Harry R. L. White
Harvey L. Hanson, Jr.

Patented Oct. 5, 1937

2,094,686

UNITED STATES PATENT OFFICE 2,094,686

ANIMAL TRAP

Herbert A. Stilson, Chicago, Ill., assignor to McGill Metal Products Company, Chicago, Ill., a corporation of Illinois Application October 24, 1935, Serial No. 46,457

8 Claims. (Cl. 43—97)

The invention relates to animal traps and particularly to locking the safety mechanism for animal traps.

One of the important objects of the invention is to embody a locking and safety mechanism in an animal trap which employs a restraining arm or jaw, for example, such a one as is disclosed in United States Letters Patent No. 1,530,918 issued March 24, 1925 to Will C. Stilson and me. This patent shows an animal trap and especially one for trapping rats and mice, which is particularly adapted for the invention and in which there is also provided "in the latching mechanism by which the trap is set, a four-way release trigger, arranged to free the trap for operation when the baited portion of the trigger is moved in any direction transverse to its length—that is to say, up or down, or to either side."

One of the major difficulties which has arisen in connection with animal traps such as are generally used for catching rats and mice, is the great fear which average persons have that they will have their fingers caught by the restraining arm or jaw of the trap beause of the very strong spring which is generally used. Many persons refuse to have anything to do with rat traps and mice traps because they have had their fingers caught in a trap or have heard of others who have had the difficulty.

It is a primary object of the invention to provide a pivoted lock which readily moves or swings into position either to hold and restrain the trap arm or jaw from operating after being set, or to release the arm or jaw so that it may operate.

Another object of the invention is to provide the pivoted locking member with features which cause an automatic operation of the locking member to place the restraining arm or jaw in the locked position and to maintain it in locked position until the user of the trap desires to manually release the arm or jaw, and also enable the arm or jaw to be in set position and ready to be sprung until the latch mechanism is released by movement of the treadle of the trap.

A further object of the invention is to construct the trap lock with an inclined plane and a hook arrangement which combine to automatically operate the pivot lock member and interpose the hook to hold the restraining arm or jaw against movement until manually released by the user.

Another object of the invention is to construct a safety lock member with two oppositely extending inclined planes, one higher than the other, so that the safety lock may be automatically operated when the restraining arm or jaw causes the lock member to automatically operate and swing into its proper locked and set position no matter in what position the lock member may be when the downward movement of the jaw initiates the swinging of the lock member.

A further object of the invention is to place the latching mechanism and its support in a particular relationship to the pivoted lock member to limit the movement of said pivoted lock member.

An additional object of the invention is to construct the pivoted lock member with a certain relation to the restraining arm or jaw, the pivot of the lock member and the entire lock so that it may be operated easily and simply without the slightest danger or harm to the user.

Another object of the invention is to construct the locking member as an integral piece of material bent and formed to meet its requirements as a safety lock.

The invention will be further understood by reference to the accompanying drawing showing an embodiment of the invention, but it will be understood that I do not limit myself to the exact construction shown and illustrated, but in the claims hereinafter set forth I intend to cover all variations and modifications of the invention.

In the drawing

Figure 1 is a top plan view reduced in size showing the restraining arm or jaw of the animal trap in set position and showing the safety lock of the invention in holding position.

Figure 2 is a full sized side elevational view of the animal trap with portions thereof and the base in section and with the parts of the trap in position as shown in Figure 1.

Figure 3 is a top plan view of the safety lock of the invention showing the lock in holding position by full lines and in swung positions by dotted lines, indicated by "A", "B", and "C" respectively.

Figure 4 is an end elevational view of the lock showing the restraining arm or jaw in section at the upper end of the lower inclined plane of the lock, and free to pass and repass the hook of the lock.

Figure 5 is an end elevational view of the lock showing the end of the lock in full lines and the cross section of the restraining arm or jaw also in full lines on top of the upper inclined plane above the hook of the lock, and in dotted lines showing the end of the lock when the movement of the jaw downwardly forces the lock to swing on its pivot and permit the restraining arm to drop and to travel downwardly on the lower inclined plane to cause the lock to swing back to its starting place or original position or beyond.

Figure 6 is another end view of the lock showing the operation thereof in full lines and in dotted lines, and shows the restraining arm or jaw traveling down the lower inclined plane, at the base of the plane, and also up under the hook of the lock.

Figure 7 is another end view showing the operation and swinging of the locking member by the restraining arm or jaw, and shows the arm or jaw on the lower inclined plane.

Figure 8 is a side view of the lock showing the upturned lock finger piece, the pivot, the perpendicular portion of the lock and the latch and its staple.

Figure 9 is an end view of the lock member from the opposite side of that shown in Figures 4, 5, 6, and 7.

Figure 10 is a top plan view of the blank from which the safety lock is made.

Like reference characters in the various figures of the drawing indicate similar parts of the structure.

The trap of the invention comprises the base portion 15 which is preferably of wood but may be of metal or other suitable material. Two posts or standards 16 and 17 are fastened in the base. These support the spring pivot pin or pintle 18 which extends transversely of the base and has its ends pass through apertures 19 and 20 respectively in the supporting posts. Intermediate of the two posts or standards 16 and 17 is the relatively strong coil spring 21 formed with two oppositely coiled sections 22 and 23 respectively with an integral central base support 24.

Loosely mounted on the pivot pin or pintle 18, between the coiled portions 22 and 23 of the spring 21 is the bait holder or treadle 25. The bait holder or treadle is provided with the elongated aperture 26 with the depressed treadle portion 27 extending under the pivot pin 18, thus holding the bait treadle in place and loosely slidable between the two coiled spring portions 22 and 23. The bait treadle 25 is also provided with the bait hook 28 at one end thereof. It will be seen that the bait hook is at the longer or relatively heavier end of the bait treadle, and the shorter end thereof is adjacent the spring pivot rod 18. The bait treadle 25 is also provided with the upturned side section 29 which is turned inwardly at its top and has the relatively small extending lip 30.

The restraining jaw, arm or yoke 31 formed with side and end portions is provided with the loops 32 and 33. The pintle 18 extends through these loops 32 and 33 which are outside of the standards 16 and 17 but are held against removal by the head 34 and the flattened portion 35 on the respective ends of the pivot rod 18.

The restraining arm, jaw or yoke 31 is always held under the tension of the spring 21, by the spring ends 36 and 37, the ends of which extend over the restraining arm or yoke 31 at the inturned portions 38 and 39 thereof. These spring ends 36 and 37 contact with the restraining arm 31 and hold the same down against the base at one end of the base when the trap is in inoperative position. At the other end of the trap base 15 the staple 40 has its legs embedded in the base, and the latch 41 is secured to this staple by means of the latch loop 42 extending through the staple 40. The locking member of the trap to be described is placed at the staple end of the base.

When it is desired to set the trap and place it in operative position with the parts which have been described up to this point, the restraining arm or yoke 31 is brought from its unset position to the opposite side of the base or that side of the base to which the latch staple 40 is secured. The yoke or arm 31 is then firmly held in position and the latch having its loop end 42 held in place by the staple 40 is swung over the outer end of the arm 31 and the opposite end of the latch is brought over the treadle 25 against the inner face of the upturned portion 29 and under the lip 30. When this has been done the outwardly extending bait-holding end of the bait holder 25 is brought up into a position parallel with the base 15. The trap which has previously been baited is now ready for operation. To set the trap so constructed is however a risky and dangerous operation as has been pointed out.

The foregoing description covers the construction with which my invention may be used, and as shown, described and claimed in Letters Patent #1,530,918 heretofore mentioned, but it will be understood that my invention may be associated and used with other forms of animal traps as well as the one which has been described.

Referring more particularly now to the locking or safety device of the trap, it consists preferably of an integral piece of metal 43 made from a single blank as shown in Figure 10, which is pivotally secured to the base 15 by the pivot pin 44. The pivot may be a screw, a headed pin with legs, a rivet, or any other suitable form of pivot. The blank from which the lock or safety device 43 is made is turned up with the upright portion 45 at one end of the horizontal portion 46. The upright end 45 is provided with a number of features which are operable to cause the restraining arm, jaw or yoke 31 to be locked or unlocked as desired. The locking and the unlocking are accomplished by means of the hook 47, the upper inclined plane 48, the opening 49 and the lower inclined plane 50.

It will be noted by particular reference to a number of the figures of the drawing that the end of the hook 47 is well within the line of the apex 51 of the lower inclined plane 50 and that the apex 51 is at the outer edge 52 of the upturned portion 45 and the horizontal portion 46 of the lock member 43. It will also be seen that the lock 43 is provided with the raised portion or relatively large flat boss or bead 53, which boss or bead extends on the upper surface of the locking member 43 and for a considerable distance on the upturned portion 45. The locking member 43 is also provided with the upturned or finger portion 54 at the end of the member opposite the upturned portion 45 and serves as a finger piece for moving the locking member 43 on its pivot 44.

Reference has been made to the setting of the trap prior to the employment of the locking means of the invention. In such a case, the restraining jaw was held down by means of the latch 41 secured at its outer end in the staple 40 and at its inner end under the lip 30 on the treadle 25. To accomplish this setting of the trap without the employment of the safety mechanism was a very difficult and a dangerous task, particularly if a strong spring were used. By the employment of the lock or safety device of the invention, it does not make any difference what position the lock 43 is in, whether it is turned in one direction or another on the pivot, or whether it is in a straight position parallel with the sides and end of the base.

When the restraining jaw is to be placed in operative position, the latch 41 is swung outwardly and permitted to hang in the staple with its free end outside the base of the trap. At this time, the lock 43 has the two longer sides of the horizontal portion 46 in parallel relation with the end of the base 15 adjacent the latch staple 40 in the "A" position as shown in Figure 3. The restraining arm 31 is then brought down against the tension of the spring 21 so that the cross bar of the jaw contacts with and descends on the upper inclined plane 48, and as it descends the plane it causes the lock 43 to swing inwardly on the pivot 44 to the "B" position shown in Figure 3.

The cross bar of the restraining arm thereupon enters the opening 49 and continuing its descent, it descends in the opening 49, contacts with and travels on the lower inclined plane 50 to the bottom of the opening 49 causing the lock 43 to reverse its movement and again move on the pivot 44, returning to its original position and beyond to the "C" position as shown in Figure 3, thus bringing the hook 47 to a position over the cross bar of the jaw 31. The restraining jaw 31 which all of this time has been under the tension of the spring 21 and held firmly in the operator's hands, is thereupon slowly released and the cross bar thereof is permitted to rise in the opening 49 and become seated in the hook 47 where it is firmly held against springing. Thereupon the latch 41 may be brought up and turned in the staple 40 and its free end brought over the held cross bar of the jaw 31 and secured in place against the upward extension 29 of the treadle 25 and below the extending lip 30.

While this was being done, however, the latch 41 was pressed downwardly in order to have its free end brought below the extending lip 30 and in doing so, the latch 41 forced the cross bar of the jaw 31 downwardly a short distance in the opening 49 away from the hook 47 but directly below it. This operation raised the treadle to a position parallel with the base. The latch 41 is thus brought over the restraining arm with no difficulty or danger whatsoever that the fingers of the operator may be caught or the user of the trap harmed in any way.

When the latch 41 has thus been brought into operative position, it forces the cross bar of the restraining arm downwardly in the opening 49 and the tension of the restraining arm and the spring is against the latch and holds the free end of the latch 41 firmly against the under face of the lip 30. At this time, the cross arm of the restraining jaw is free of the hook, but in a direct line below it and is also free of the lower inclined plane 50.

In the event the latch should become loosened and its end fly out from under the lip 30, the cross arm of the restraining jaw 31 would rise in the opening 49 and be caught by the hook 47. This is so because the locking member 43 is still in the "C" position. If the latch should become loosened, it is again brought over the cross bar of the arm 31, the cross bar is again forced downwardly in the opening 49 and thereupon the locking member 43 may be swung on its pivot so that the hook 47 is out of line of travel of the cross arm of the restraining jaw 31 when it is operated and flies upwardly out of the opening 49.

This is accomplished by moving the locking member 43 on its pivot 44 so that it assumes the "B" position moving the hook 47 toward the outer end of the base 15. This is effected by the use of the finger piece 54 to swing the locking member 43 on its pivot. The trap which has previously been baited is then set and ready to be sprung when the animal touches the treadle 25 and causes the release of the latch 41 from under the lip 30 and over the end or transverse portion of the restraining jaw 31.

The movement of the locking member 43 into the "B" and "C" positions is limited by the action of the swinging upturned portion 45 against the staple 40. It will be noted that the boss or bead 53 has its embossed surface toward the pivot 44 and its indented surface toward the staple. As the locking member 43 is swung, it is limited by the staple 40 because the locking member and the staple are placed so closely together that one side of the staple adjacent the upright portion of the locking member brushes against the inner surface of the indenture and causes the locking member 43 to stop at either end of the indenture depending on whether the locking member is moved to the "B" position or the "C" position. When it is in the "A" position, the end of the staple is substantially in line with the center line of the indenture. This construction which limits the swinging of the locking member 43 is best shown in Figure 3 of the drawing. In addition to serving as a limiting stop for the movement of the locking member 43 against the staple 40, the boss or bead 53 serves to strengthen and make the locking member 43 in both its horizontal and upright portions firm and rigid, as it must necessarily be because of the work it is required to do.

It will be understood that it is immaterial what angle the locking member 43 assumes on the pivot pin 44. The restraining jaw 31 moves the locking member 43 when it descends on either the upper inclined plane 48 or the lower inclined plane 50, or both of them in sequence. These movements of the locking member depending upon the angles of the locking member and the descent of the restraining arm 31 are best shown in Figures 3 to 7 inclusive. The dotted lines in these figures indicate the limit of travel of the pivoted locking member 43 when the restraining jaw 31 causes the locking member to swing when it is brought down on the inclined planes of the upright portion 45 of the locking member.

Having thus described the invention, what I claim and desire to secure by Letters Patent is:

1. In a lock for animal traps, an integral member, said integral member being bent into horizontal and upright portions, the upright portion being provided with an inclined plane and a hook, said hook being higher than said inclined plane.

2. In a lock for animal traps, an integral member, said integral member being bent into horizontal and upright portions, the upright portion being provided with an inclined plane, a hook, and a second inclined plane, said hook being higher than the second inclined plane.

3. In a lock for animal traps, an integral member, said integral member being bent into horizontal and upright portions, the upright portion being provided with an inclined plane, a hook and a second inclined plane, said hook being higher than the second inclined plane, said inclined planes being oppositely disposed toward one another and extending in opposite directions.

4. In a lock for animal traps, an integral member, said integral member being bent into horizontal and upright portions, the upright portion being provided with an inclined plane, a hook, and a second inclined plane, said hook being higher than the second inclined plane, said upright portion of said member being provided with a bead, said bead being adapted to have swinging contact with a supporting member on said trap.

5. In an animal trap embodying trapping mechanism including a base and a restraining jaw, a locking mechanism, said locking mechanism consisting of an integral member having horizontal and upright portions, the upright portion of said locking mechanism being provided with a hook to hold said restraining jaw, said locking mechanism being pivotally secured to said base and adapted to be moved in and out of locking engagement, said upright portion being provided with an inclined plane, said restraining jaw being adapted to contact with and move on said inclined plane to cause the swinging of said integral locking mechanism on its pivot.

6. In an animal trap embodying trapping mechanism including a base and a restraining jaw, a locking mechanism, said locking mechanism consisting of an integral member having horizontal and upright portions, the upright portion of said locking mechanism being provided with a hook to hold said restraining jaw, said locking mechanism being pivotally secured to said base and adapted to be moved in and out of locking engagement, said upright portion being provided with an inclined plane, said upright portion being provided with another inclined plane, said two inclined planes being oppositely disposed to one another, said restraining jaw being adapted to contact with and descend on one of said inclined planes to move said locking mechanism in one direction and adapted to contact with and descend on the other of said inclined planes to move the locking mechanism in the opposite direction.

7. In an animal trap embodying trapping mechanism including a base and a restraining jaw, a locking mechanism, said locking mechanism consisting of an integral member having horizontal and upright portions, the upright portion of said locking mechanism being provided with a hook to hold said restraining jaw, said locking mechanism being pivotally secured to said base and adapted to be moved in and out of locking engagement, said upright portion being provided with two oppositely disposed inclined planes, said restraining jaw being adapted to contact with and descend on one of said inclined planes to move said locking mechanism in one direction and being adapted to contact with and descend on the other of said inclined planes to move the locking mechanism in the opposite direction, said vertical section being provided with an indented boss or bead and said upright section being adapted to move against a staple which limits the swinging of said locking mechanism when the interior face of said boss or bead swings against the staple.

8. In an animal trap embodying trapping mechanism including a base and a restraining jaw, a locking mechanism, said locking mechanism consisting of an integral member having horizontal and upright portions, the upright portion of said locking mechanism being provided with a hook to hold said restraining jaw, said locking mechanism being pivotally secured to said base and adapted to be moved in and out of locking engagement, said upright portion being provided with two oppositely disposed inclined planes, said restraining jaw being adapted to contact with and descend on one of said inclined planes to move said locking mechanism in one direction and being adapted to contact with and descend on the other of said inclined planes to move the locking mechanism in the opposite direction, and an additional upright portion on said locking mechanism arranged transversely to said first mentioned upright portion and adapted to serve as a finger piece for the swinging of said locking mechanism.

HERBERT A. STILSON.